(12) United States Patent
Wynter et al.

(10) Patent No.: US 8,755,991 B2
(45) Date of Patent: Jun. 17, 2014

(54) METHOD AND STRUCTURE FOR VEHICULAR TRAFFIC PREDICTION WITH LINK INTERACTIONS AND MISSING REAL-TIME DATA

(75) Inventors: Laura Wynter, Yorktown Heights, NY (US); Wanli Min, Yorktown Heights, NY (US); Benjamin G. Morris, Yorktown Heights, NY (US)

(73) Assignee: TomTom Global Assets B.V., Amsterdam (NL)

( * ) Notice: Subject to any disclaimer, the term of this patent is extended or adjusted under 35 U.S.C. 154(b) by 1142 days.

(21) Appl. No.: 12/619,226

(22) Filed: Nov. 16, 2009

(65) Prior Publication Data

US 2010/0063715 A1 Mar. 11, 2010

Related U.S. Application Data

(63) Continuation of application No. 11/626,592, filed on Jan. 24, 2007, now Pat. No. 7,953,544.

(51) Int. Cl.
*G06F 19/00* (2011.01)
*G06G 7/70* (2006.01)
*G06G 7/76* (2006.01)
*G08G 1/00* (2006.01)

(52) U.S. Cl.
USPC ........... 701/119; 701/117; 701/118; 701/414; 701/423; 340/995.13

(58) Field of Classification Search
USPC .......... 701/117, 118, 423, 119, 414; 702/179; 342/454; 340/934, 995.13; 714/E11.197
See application file for complete search history.

(56) References Cited

U.S. PATENT DOCUMENTS

| | | | |
|---|---|---|---|
| 6,496,773 B1 * | 12/2002 | Olsson | 701/117 |
| 6,876,988 B2 * | 4/2005 | Helsper et al. | 706/21 |
| 7,274,306 B2 | 9/2007 | Publicover | |
| 7,363,144 B2 | 4/2008 | Liu et al. | |
| 7,472,099 B2 * | 12/2008 | Nishiuma et al. | 706/45 |
| 7,555,381 B2 * | 6/2009 | Kumagai et al. | 701/117 |
| 7,668,946 B1 * | 2/2010 | Garcia-Franco et al. | 709/223 |
| 7,706,965 B2 * | 4/2010 | Downs et al. | 701/117 |
| 8,103,434 B2 * | 1/2012 | Helbing et al. | 701/117 |
| 2002/0049687 A1 * | 4/2002 | Helsper et al. | 706/45 |
| 2005/0091176 A1 * | 4/2005 | Nishiuma et al. | 706/45 |
| 2006/0058940 A1 * | 3/2006 | Kumagai et al. | 701/117 |
| 2006/0206256 A1 * | 9/2006 | Kumagai et al. | 701/117 |
| 2008/0030371 A1 * | 2/2008 | Kumagai et al. | 340/905 |
| 2008/0046165 A1 * | 2/2008 | Downs et al. | 701/117 |
| 2008/0175161 A1 | 7/2008 | Amemiya et al. | |
| 2008/0235398 A1 * | 9/2008 | Helbing et al. | 709/243 |
| 2009/0099760 A1 * | 4/2009 | Lederman et al. | 701/118 |

FOREIGN PATENT DOCUMENTS

| | | |
|---|---|---|
| EP | 1127727 A2 | 8/2001 |
| WO | WO2008063225 | 5/2008 |

* cited by examiner

*Primary Examiner* — Khoi Tran
*Assistant Examiner* — Jaime Figueroa

(57) ABSTRACT

A method and apparatus for predicting traffic on a transportation network where real time data points are missing. In one embodiment, the missing data is estimated using a calibration model comprised of historical data that can be periodically updated, from select links constituting a relationship vector. The missing data can be estimated off-line whereafter it can be used to predict traffic for at least a part of the network, the traffic prediction being calculated by using a deviation from a historical traffic on the network. The invention further discloses a method for in-vehicle navigation; and a method for traffic prediction for a single lane.

11 Claims, 6 Drawing Sheets

A: [B, C, D, E, F]          — 300

Relationship Vector for Link A

A: [+1, +3, 0, -1, 0]       — 301

Difference Vector for Link A

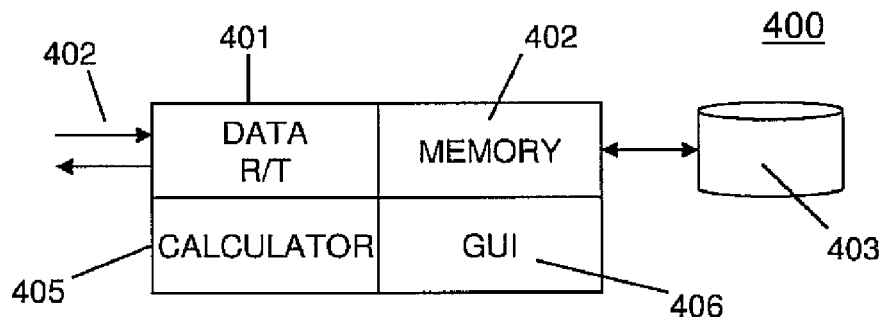
FIGURE 4
FIGURE 5
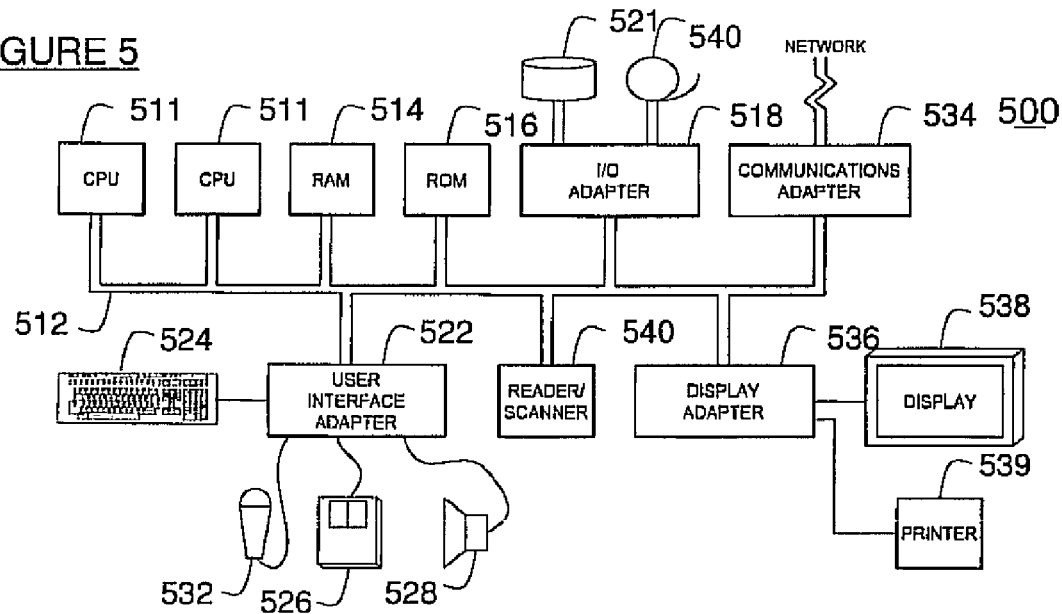
FIGURE 6
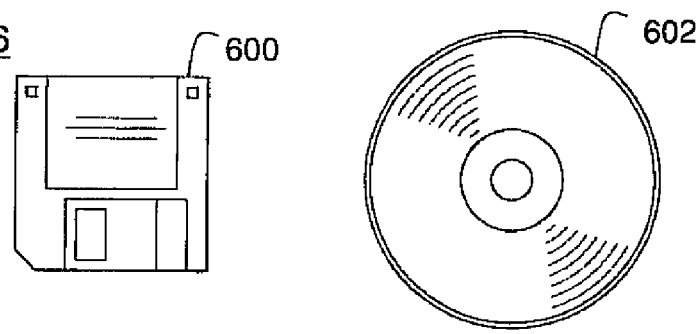

METHOD AND STRUCTURE FOR VEHICULAR TRAFFIC PREDICTION WITH LINK INTERACTIONS AND MISSING REAL-TIME DATA

This application is a continuation-in-part of U.S. Ser. No. 11/626,592, filed Jan. 24, 2007, which published Jul. 24, 2008 as US Patent Application 2008/0175161 A1, the entire contents of which are hereby incorporated by reference.

FIELD OF THE INVENTION

The present invention generally relates to predicting traffic states on a transportation network. Specifically, the present invention provides a means for effectuating traffic state prediction in the absence of real-time data. In one aspect, the invention provides a method to fill-in the missing data sufficient to make accurate and reliable predictions into the future.

DESCRIPTION OF THE RELATED ART

In the transportation sector, travel time information is necessary to provide route guidance and best path information to travelers and to fleet operators. This information is usually based on average travel time values for every road segment (link) in the transportation network. Using the average travel times, best path computations can be made, using any of a variety of shortest path algorithms. A route is thus a sequence of one or more links in the transportation network. In order to determine route guidance and best path information for future time periods, several conventional methods are available.

The standard way in which such information is provided is to make use of average values, as described above. The use of those average values provides an average-case best route or path to a user. However, due to congestion on roadways, average-case travel times on the link may vary considerably from the travel times at specific time periods. For example, the peak travel time along a link may be twice the travel time at off-peak periods. In such cases, it is desirable to make use of time-dependent values for the travel times on links in providing route guidance and/or best path information to users.

In a first conventional method related to reporting vehicle data, objects such as queues are identified in a traffic stream and those objects are tracked, allowing for an estimated value of the traffic parameter, which may include travel time. In particular, data "relating to the mean number of vehicles in the respective queue, the queue length, the mean waiting time in the queue and the mean number of vehicles on the respective direction lane set of a roadway section, and relating to current turn-off rates, can be used on a continuous basis for producing historical progress lines", where historical progress lines imply the prediction of the current value to a present or near future time period. This first, method becomes quite complex if link interactions are taken into account and real-time computation of such values are not possible.

In a second conventional method, the prediction of speed information is provided for multiple time intervals into the future (e.g., on the order of 0-60 minutes to several hours or 1-3 days into the future). This second method described takes a historical speed for a similar link at the same time instant for the same type of day and multiplies it by a weighting factor less than or equal to one, determined through regression on such parameters as predicted weather conditions, construction, and any known scheduled events on the segment. This second method hence relies upon high-quality predicted weather data, as well as information on scheduled events along the link in question. However, such data is not often available in a form amenable to incorporation into traffic predictions.

Considerable literature exists on traffic prediction methods, which include traffic assignment, dynamic traffic assignment, network equilibrium, simulation, partial differential equation-based models, etc., as are described, for example, in Y. Sheffi, "Urban transportation networks: Equilibrium analysis with mathematical programming methods", Prentice-Hall, Englewood Cliffs, N.J., 1985. The website article "Dynasmart", by H. Mahmassani, also describes traffic prediction methods. [http://mctrans.ce.ufl.edu/].

However, most conventional methods are computationally intensive and cannot, therefore, provide results for large areas. They are rather limited to small- to moderate-sized geographic areas and are not practical to provide state-dependent internet mapping, route guidance, or fleet management for large areas such as on the order of multiple regions, states, or countries.

On the other hand, it is necessary to have some prediction of traffic conditions into the future so as to estimate travel times and best paths for future times.

A third conventional method is concerned with detecting "phase transitions between free-flowing and slow-moving traffic and/or stationary traffic states", which is a method quite different from that of the present invention.

The second conventional method, previously mentioned, describes a traffic information system for predicting travel times that utilizes Internet based collecting and disseminating of information. This method is also different from that of the present invention in that it uses a set of look-up tables with discount factors based on predicted weather or special planned events. That is, each class of weather is associated with a speed discount factor, or travel time increase factor, and, depending on the predicted weather on a link, that discount factor is applied.

A fourth conventional method uses probe vehicles to predict traffic conditions

Another predictions method, while enabling very fast computation of traffic predictions, operates in part on the assumption that each link on the traffic network can be predicted independently and entails the exclusive use of templates. This solution requires more data than that of the second conventional method, for example, and uses a template technique for identifying the historical progression of travel times on each link that best matches its characteristics. The use of the term "template" refers to a pattern which is constructed to represent the shape of the traffic characteristic over a reference period, such as a day, or an hour, and each such reference period may have its own template, or pattern. In contrast to assumptions in the first conventional method, this template technique is applicable on road segments where very little data is available and, hence, can be applied to rural and suburban regions. Traffic speed is an important characteristic of traffic state predicted by the method of this commonly-assigned invention. Traffic density or other similar traffic state variables may also be predicted by the same technique.

Commonly-assigned patent application U.S. Ser. No. 11/626,592, filed Jan. 24, 2007, published Jul. 24, 2008 as US Patent Application 2008/0175161 A1 entitled "Method and Structure for Vehicular Traffic Prediction with Link Interactions," the contents of which are incorporated herein in their entirety, discloses additional prediction embodiments.

While these last methods are quite serviceable, they are nonetheless subject to improvements, not the least of which is accounting for missing data. It is often the case that traffic data provided in real-time has missing values. This can happen due to various reasons: faulty transmission of data, the filtering out of data, the placement of a data sensor in a different location, etc. Indeed, most methods known heretofore are invalidated by missing data; or to the extent they purport to supply such missing data, they are computationally burdensome and are unable to run on a fine-grain time scale, e.g. one having an algorithm that updates every 5 minutes or even more frequently.

Additionally, there is a need for providing in-vehicle information as to current driving conditions and routing guidance from traffic infrastructure, such as traffic signals and the like. U.S. Pat. No. 6,989,766, assigned to the present assignee and fully incorporated herein by reference, discloses a method by which traffic signal systems make phase data available to vehicles. U.S. Pat. No. 7,274,306 provides a method for controlling the speed of vehicles based on traffic signal phase data in order to avoid unnecessary acceleration along a determined route. This does not provide advice on alternate routes that may be more effective in achieving the route of the shortest time. European Patent EP1127727 provides precise cruise control (speed) commands in order to avoid violating a red light. This work provides improved safety outcomes, but does not improve outcomes associated with the time of a route or trip. Finally, in a paper entitled: "The Automatic Green Light Project—Vehicular Traffic Optimization via Velocity Advice" there is described a method to estimate traffic signal phase cycles based on GPS-collected historical and real-time speed of traffic data. It also provides a method to deliver speed advice to catch "green waves" and avoid acceleration (positive or negative).

Finally, there is a need for a method that can predict traffic conditions and provide guidance at the level of a single lane. Existing methods for traffic prediction are not effective at the level of road lanes. Specifically, existing methods suffer from the following problems if applied at the level of road lanes, including: Algorithm Instability (ineffectiveness) and Intractability (non-solvability). For the former, typically when lane-level traffic data is available, oftentimes similar traffic on neighboring lanes of a link leads to almost identical traffic data across lanes of the same network link. Extant algorithms do not adequately deal with this degeneracy across lanes and hence suffer from numeric instability due to the singularity or near-singularity of algorithm matrices. For the latter, straightforward adaptation of existing methods, including Traffic Prediction Tool (TPT), to lane level prediction suffer from intractability. In particular, when granularity goes from network link down to lane level, the complexity (number of parameters to estimate) increases significantly. Moreover, there is typically a lack of real-time data on traffic at the lane level, and the raw signal collected from detectors is often aggregated to the granularity of network link in the signal processing stage. So lane specific data may not be seen in real-time.

The present invention improves upon the foregoing methods by taking into account missing real-time traffic data which could otherwise result in invalidation or faulty predictions; by further providing a method of in-vehicle provision of traffic information and routing advice to the driver; including at the level of a single lane of traffic. Traffic data in this regard includes, without limitation, traffic volumes, speeds, densities, or other measures of road traffic at a given point in time and space.

SUMMARY

The present invention is a method and apparatus by which vehicular traffic prediction can be calculated both accurately and faster than using conventional methods and can be used in the presence of missing real-time data.

In one embodiment, the invention is to an apparatus comprising a receiver to receive data related to traffic on at least a portion of a network and a calculator to calculate a traffic prediction for at least a part of the network, wherein the traffic prediction is calculated by using a deviation from a historical traffic pattern on the network and permits performing said traffic prediction in the presence of missing real-time data.

In another embodiment, the invention is to a method of predicting traffic on a network, said method comprising: receiving data related to at least a portion of said network; and calculating a traffic prediction for at least a part of said traffic network by using deviation from a historical traffic on said network As a second exemplary aspect of the present invention, also described herein, is a method to calculate a traffic prediction for a traffic network, using a deviation from a historical traffic pattern on the network and using techniques for estimating missing real-time data.

In yet another embodiment, the invention is to a signal-bearing medium tangibly embodying a program of machine-readable instructions executable by a digital processing apparatus to perform a method of predicting traffic on a network, said program comprising: a receiver module to receive data related to traffic on at least a portion of a network; and a calculator module to calculate a traffic prediction for at least a part of said network, wherein said traffic prediction is calculated by using a deviation from a historical traffic on said network and techniques for estimating missing real-time data.

In another embodiment, the invention is to a method of providing navigational guidance to a vehicle over a transportation network, said transportation network comprised of routes with traffic signals, the method comprising a) providing to a processor: trip information, said trip information comprising an origin and a destination for said vehicle; and a radius, said radius measured from said vehicle when said vehicle is on said transportation network; b) obtaining data from one or more traffic signals within said radius, at intervals of time, said data relating to one or both of the following: (i) information on the state of at least one of said traffic signals for a respective interval of time; and (ii) routing table information, said routing table information indicative of state of traffic for routes to said destination on said transportation network c) processing said data with said trip information to identify optimal route choices to said destination on said transportation network for said vehicle; and d) providing said optimal route choices to said vehicle.

In yet another embodiment, the invention is to a method of predicting traffic for a specific lane on a transportation network comprised of links wherein said links constitute a relationship vector, which method comprises a) providing data points related to real time traffic conditions for a specific lane in a link of a transportation network; b) updating a template representative of a historical traffic pattern for said specific lane in accordance with said data points; and c) providing a prediction of traffic for said specific lane in accordance with said updated template.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 shows a block diagram 400 of an application program that could implement the method of the present invention;

FIG. 5 illustrates an exemplary hardware/information handling system 500 for incorporating the present invention therein; and FIG. 6 illustrates a signal bearing medium 600, 602 (e.g., storage medium) for storing steps of a program of a method according to the present invention.

DETAILED DESCRIPTION OF AN EXEMPLARY EMBODIMENT OF THE INVENTION

Figure 1A:
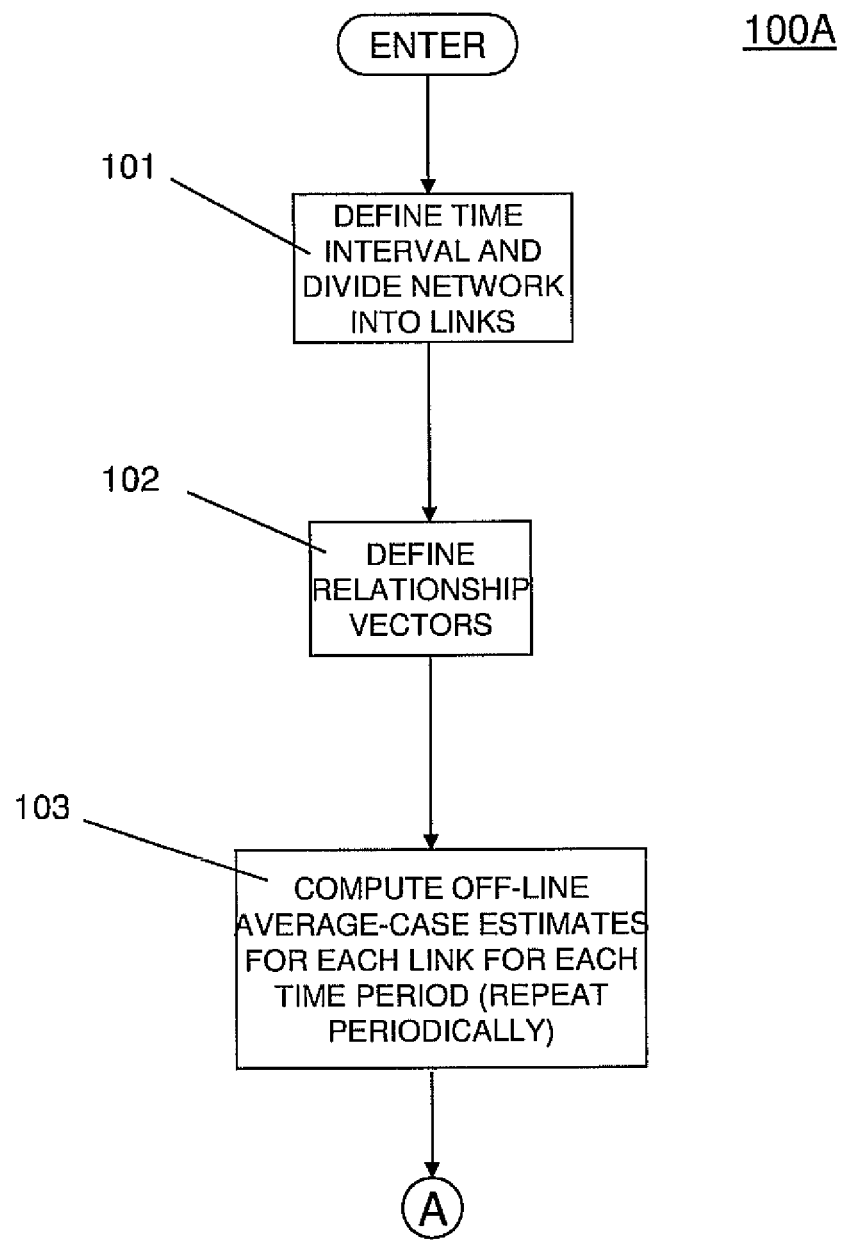
FIGS. 1A-1C show a flowchart 100A, 100B, 100C of an exemplary embodiment of the method of the present invention.

The invention provides an exemplary technique for determining the traffic state characteristics (e.g., speed, density, flow, etc.) that best characterize the progression of that state into the future.

In one aspect, the invention is to a method for predicting traffic on a transportation network, the transportation network comprised of links, the links constituting a relationship vector, the method comprising: a) providing data points related to real time traffic conditions on each link, wherein at least one data point is missing for a given link; b) estimating the value of the missing data point from a calibrated model comprised of historical data points from all links in the relationship vector, except those of the given link; and c) using the value to predict traffic for at least a portion of the transportation network by deviation from a historical traffic pattern of the network. In one embodiment, a plurality of data points are missing from a plurality of given links. In another, the data points are provided from predetermined locations, e.g. a traffic sensor, camera etc. The historical data points used can comprise any past time period, e.g. that for the preceding two, three, four, five, six or more weeks for the links constituting the calibration model. The calibration model can be updated periodically, e.g. every day, every few days, every week, etc. For convenience, the estimating step can be performed off-line.

In another aspect, the invention is to an apparatus for predicting traffic on a transportation network, said transportation network comprised of links, the links constituting a relationship vector, the apparatus comprising: a) a receiver to receive data points related to real time traffic conditions on each link, wherein at least one data point is missing from a given link; b) an estimator to estimate the value of the missing data point; and c) a calculator to calculate a traffic prediction by using the estimated value in a deviation from a historical traffic pattern of the network. In one practice, the estimator comprises a calibrated model constituted of historical data points from all links in the relationship vector, except those from the given link. The data points can be provided from predetermined locations, as aforesaid.

In yet another aspect, the invention is to a computer readable medium containing an executable program for predicting traffic on a transportation network, the transportation network comprised of links, the links constituting a relationship vector, where the program performs the steps of a) receiving data points related to real time traffic conditions on each link wherein at least one data point is missing from a given link; b) estimating the value of said missing data point using a calibrated model constituted of historical data points from all links in the relationship vector, except those from the given link; and c) calculating a traffic prediction by using the estimated value in a deviation from a historical traffic pattern of the network. The historical data points in the calibrated model can be periodically updated, as aforesaid.

Detailed Description of an Exemplary Prediction Algorithm

Figure 1B:
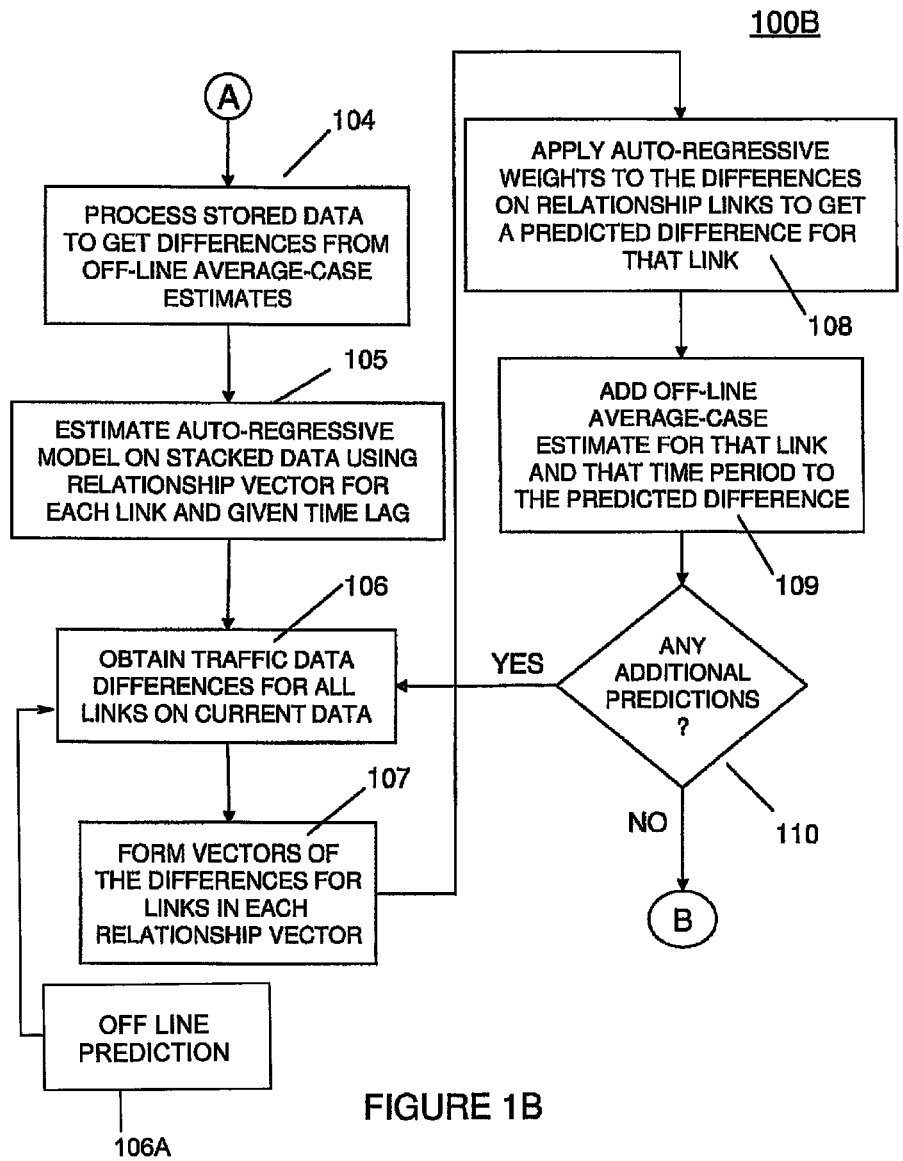
Figure 1C:
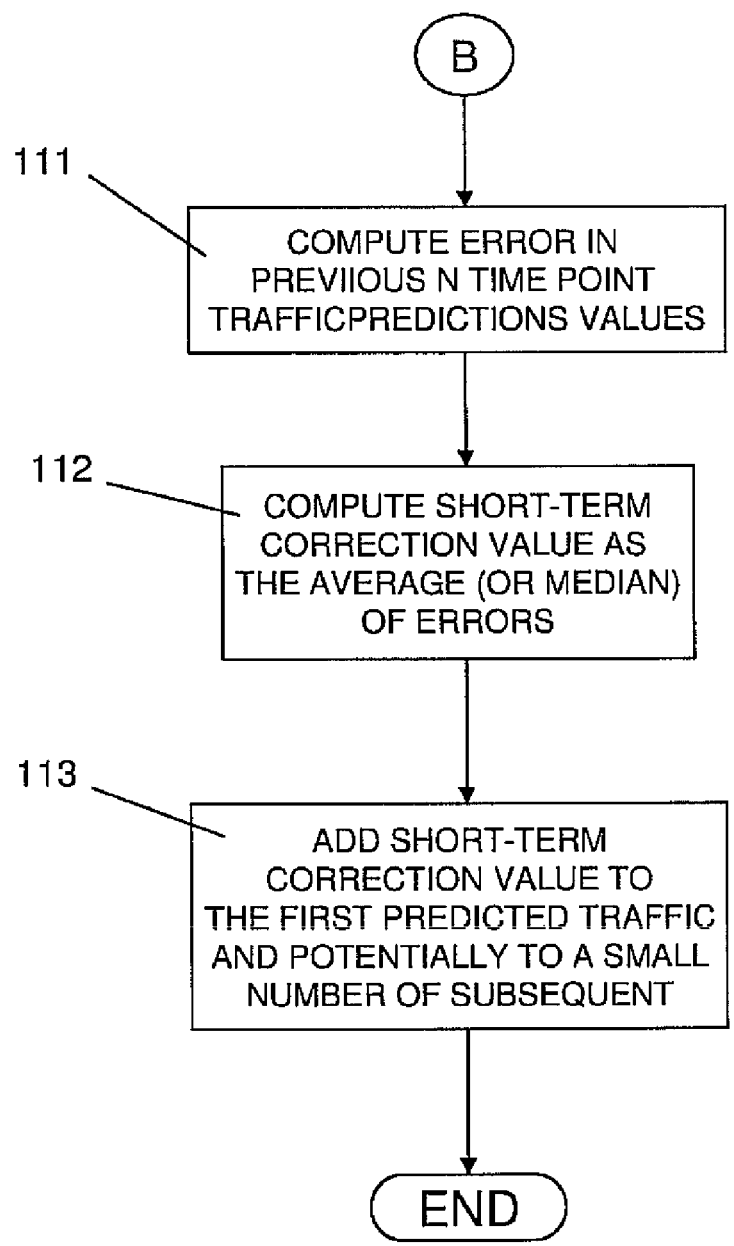

FIG. 1A through FIG. 1C show a flowchart 100A-100C of the method described below for the exemplary embodiment, including a number of steps to be performed before any predictions are made (FIG. 1A).

The algorithm recognizes that near-term predictions rely on information from upstream links at prior time intervals in order to be accurate. However, the more data that is included in the computation of the predicted value, for a given link, the longer the computation time. Hence, this algorithm provides a balance between the two needs, for computational efficiency.

The means for handling correlations across links depends on the type of road for the link in question. A highway, for example, will require a larger number of links to be cross-correlated upstream than a surface street. This is the case because the vast majority of traffic on a highway continues on the highway for multiple links, whereas on surface streets, the percentage is considerably smaller.

First, as shown in step 101, one must perform a division of time and space into, preferably, relatively homogeneous subsets. An example of dividing time into relatively homogeneous intervals is to consider each day of the week and each hour of the 24-hour day separately, as in Monday 12 pm, Monday 1 pm, . . . Friday 9 pm, . . . Sunday 3 am, etc. A different, and less detailed division of time into intervals may be to consider each day of the week and two time subsets per day, peak and off-peak, as in Monday peak, Monday off-peak, Tuesday peak, Tuesday off-peak, etc. Other appropriate time divisions are, of course, possible.

As regards spatial decomposition, the network in the exemplary embodiment is also divided into links included in the network In step 102 a relationship vector for every network link to be predicted is defined. The relationship vector for each link contains the other links of the network whose traffic has an impact on that link.

One way of computing the relationship vector for a link is to evaluate which upstream links have traffic that would be present on or pass through the link in question during the prediction interval. For instance, if the prediction interval is 5 minutes, and the time division is an off-peak time point (e.g., "off-peak" or "3 am", etc), then, based on the average speed on that link during that type of time interval, one can determine the number of miles/kilometers that could be traversed in the prediction interval (5 nm in this example).

Hence, the number of upstream relationship links that could be included form a "tree" in that they branch out behind the link, and go back a number of miles/kilometers from the link in question. Similar arrangements can be used to determine the downstream links to be included in the relationship vector for that link. In addition to upstream and downstream links, one can include additional links that share either the head or the tail node of the link in question. The link itself should be included in the relationship vector.

This one-time procedure is repeated for all links, and it need only be repeated when the network changes. It is noted that the number of links to include in the relationship vector depends upon the time window of any specific prediction, since, the longer the time period, the more traffic from distant upstream links will impact the given link.

The choice as to how detailed to make the time division and the relationship vector can depend on a study of the historical data patterns and balancing the heterogeneity of the data with the computational requirements of running the method for each selected time subset and geographical subset.

Once these steps are performed, the next step 103 of the method exemplarily described herein is to compute off-line average-case estimates of the traffic for each link and for each time period. There are different ways to produce these estimates, such as taking mean values for that link, with that time period going back several time periods in the past to obtain the mean value. Any reasonable method can be used to create these values. Naturally, the better the fit of the off-line average case estimates are to the actual data, the higher the accuracy of the traffic prediction. These values can be, and preferably are, re-run periodically to capture long-term trends in the traffic.

Using the off-line average-case estimates of the traffic for each link, the historical traffic is then processed to contain only deviations from the off-line average-case estimates. In other words, in step 104 a difference is taken between those and the historical traffic. Thus, in the present invention, historical traffic is used for calibration, and predictions are made on current or real-time traffic as it arrives, predicting up to, for example, up to one or two hours into the future. The processed differences are stored in matrix form by concatenating the differences for successive time periods of the same type for all links in the relationship vector for that link.

Then, in a loop over all the links, in step 105, an auto-regressive model is estimated on that matrix, using a time lag to be specified, and which depends on the prediction time interval. An auto-regressive model is characterized by the time lag that it uses. In this method, a time lag of 3-5 data intervals into the past is reasonable in most instances. A data interval is the frequency at which data is recorded on each link, such as every minute, every 5 minutes, or every 10 minutes, etc.

Missing Real Time Traffic Data Aspect:

In general, when certain data is missing, including real time data, because e.g. it failed to transmit, it was faulty or unusable, it was filtered out, etc., the present invention provides methodology to reliably and accurately predict traffic real time or near term future traffic patterns. "Near term" in this regard includes predictions going several minutes up to several hours into the future, e.g. 5 minutes up to 90 minutes, in time increments chosen by the user. In one embodiment, the invention uses any of the known prediction methods aforesaid, but employs a separate off-line phase and algorithm to fill in the missing data using e.g. an off-line calibrated model. After the missing data is thus filled in, the particular known method being employed is returned to where it can now continue the prediction even though various real time data are actually missing.

In order to permit the exemplary method described herein to handle real-time data with missing values, some extension of the method is required. Indeed, using the herein-described method, there is an implicit assumption that the links and time lags that arc used in the offline model-building phase will have data provided in the real-time model utilization phase. Otherwise, some component of the expected value will be neglected, reflecting the contribution of those links that did not provide data in the real-time usage.

Hence, the following strategy is preferably employed to account for this possibility and enable high-quality predictions to be made in the presence of missing real-time data.

The herein-described method represents the first part of the extended offline phase. In the first part, a perfect data base case is modeled (herein "calibration model" or "calibrated model") and associated parameters for real-time use are obtained.

To account for less-than-perfect real-time data, in that some values are missing, other scenarios can be carried out in the offline phase. The number of such scenarios to run for each network link depends upon the number of links in the relationship vector for that link. As an example, if a link, called link i, has 10 links, including itself, in its relationship vector, the scenario building phase involves running an offline estimation for link i, for each scenario.

Different degrees of precision which can be used in determining the scenarios. The determination involves a tradeoff between accuracy and computation time. In many cases, the method of the invention can be used, without limitation, on a medium- to large-sized urban area, in which case computation time for each scenario and each link will not be inordinately high. In such a case, an exemplary definition of scenarios that has a moderate computation time involves defining as many scenarios for each link as the length (in number of links) of that link's relationship vector. While this can increase the computation time on average by the average length of a relationship vector, these computations are preferably performed offline and preferably on dedicated computer hardware. In that respect the additional computation time of the offline phase does not impact the online running time.

An exemplary way to define the scenarios is as follows. The first additional scenario can be one in which the data from link i at the most recent time point is missing. This is the most valuable scenario for reasons which will become apparent below. Then, a model is estimated in which the current data from all relationship links except the link for whom the estimation is run have data for the most recent time point. In other words, a single data element is missing, that of link i's traffic at the most recent time point. The model's purpose is to predict the current (and missing) data point for link i. The resulting output is stored for future use in the real-time phase, to "fill in" such missing values in the real-time data.

The manner in which to define the additional scenarios can vary, but an exemplary manner is as follows: one additional scenario is run for two missing data points from the most recent set of data, then one for three missing data points, etc. It is likely to be advantageous for each scenario to suppose that the link for whom the estimation is being computed is one of those with missing data, since the estimation will be run for each link, thereby eventually filling in the other links' most recent data values, even if they were missing. Hence, a second additional scenario may be that the link i and one other link are missing data. In fact there are as many possible other links to use in this role as there are other links in the relationship vector. One method is to try each one, at a potential cost of computation time. Another method is to choose randomly one other link whose most current data is suppressed. This is because in the real-time phase, it cannot be known which links will experience missing data.

The third additional scenario continues as such: the link i, as well as two other links see their most current data points suppressed, and the model re-estimated. Resulting output weights are then stored. In all, up to the length of the relationship vector additional output weight vectors are stored for link i. In that last scenario, the interpretation is that no current data has arrived, and the model must make use of complete data for preceding time points only. To summarize, rather than a single output weight matrix, for all links, to be used in the real-time online phase, this extended method produces a number of such matrices, each one representing a different number of missing data points from the most recent data. The total number of such matrices will equal the maximum length of a relationship vector, across all the links. For the links whose relationship vector is shorter than the given matrix number, such scenarios will be empty for those links.

The weights obtained from the auto-regressive model are then used in a continuous, or real-time, mode as new traffic data is provided. Traffic data that is provided continuously is processed by subtracting the off-line average-case estimates for each link for each time period from those traffic values, i.e. obtaining "traffic differences" for each link, in step 106. Traffic data that is missing is predicted off-line in step 106a in accordance with the invention.

Then, at 107, FIG. 1B, vectors are formed for each link which contain these traffic differences for all of the links in the relationship vector for that link.

Next, in step 108, the auto-regressive weights which were computed off-line in step 105 for that link and the same type of time instant that was just provided (e.g., Monday 12 pm, Tuesday peak, . . . ) are applied to that vector of traffic differences. This provides an ideal traffic difference for that link at that instant in time.

In the event that, for a given link, called link i, the real-time data is available for all links in link i's relationship vector, then the first, base case is used and the weights corresponding to that base scenario are applied to the traffic differences for all those links pertaining to link i.

An efficient way to process the links to handle the potential missing data is to first make a pass in which all those links whose data at the current time point is missing are treated first.

In the event that the current data for one such link, i, is missing, but all other links in the link i's relationship vector have real-time data, then the first additional scenario is applied and the corresponding matrix of weights is used. The result is to "fill in" the missing data for link i in the current, real-time data.

By applying the weights from the appropriate scenario and hence the appropriate weight matrix, a value is assigned for any missing data for which there is the required model. In other words, when there is data history for such links, models for missing data are estimated offline, and applied in real-time as needed to compute likely values at the current time point for the missing data.

It is useful to note that the real-time computations required are not very high, as compared with the version of the method that is not able to handle missing real-time data. Indeed, the first step is to pass through the data and apply the appropriate scenario only to those links whose own real-time data is missing, thereby filling them in. This step permits predictions for those links that would not have been effective otherwise and does so with very little extra computation (one vector product). A link for which there was missing data for some of its neighboring links, after those links have been processed, need not undergo any additional calculations in real-time as those links' data have been filled in, and the usual (complete data) real-time calculations can be applied.

Then, as the missing data has been estimated via the additional scenarios, the real-time phase can be applied to predict the real-time (received and computed) values into the future using the original, base case set of weights.

Once these computations are complete, in step 109, the off-line average-case estimate for that type of time period provided (e.g. Monday 12 pm, Tuesday peak, . . . ) is added back to the traffic difference to provide an estimate of the traffic for that link at the next time instant.

In order to compute traffic predictions for subsequent time instants, in step 110, the predicted value just obtained is stored as if it were an actual observation, for this and for all links. Then the process is re-applied for the next time instant in the future.

For example, if the prediction interval is 5 minutes, then the first set of predictions will be for all links 5 minutes from the current time. The process is re-applied using those estimates (as if they were actual observations) to obtain the traffic prediction two prediction intervals away (e.g., 10 minutes in the above example). The process can be repeated, usually on the order of 10-20 times at most. The quality of predictions thus made are most accurate for the short to medium term. For longer-term intervals, the off-line average-case estimates may be used.

The set of matrices of weights for all the scenarios, as well as the off-line average-case estimates, are updated periodically, such as weekly.

As shown in steps 111-113 in FIG. 1C, to improve further the accuracy of the very short-term predictions, an additional process 100C may also be performed. This process makes use of the predictions described above and is most accurate for very short-term predictions, such as 5 to 10 minutes. Using the prediction already computed (e.g., for 5 minutes from the current time), the error between the predictions and the observed traffic is noted for the past several time points on a given link, by subtracting the observed traffic from the predicted traffic, in steps 111 and 112. The number of such time points may be 3-5, in a typical implementation.

Then a measure of the average error is computed, such as the mean of those error values, or the median, or the trimmed mean (i.e. the mean excluding the highest error).

This average error is then added to the current prediction, in step 113. It may be added to the next prediction(s) directly, or simply through the current prediction (which is, itself, used in subsequent predictions). This process may be of particular use in the presence of anomalies, such as incidents on links.

EXAMPLE 1

In one preferred practice, the overall structure of the model used in the invention is represented by $Y(itr)=m(itr)+x(itr)$ wherein "r" denotes the template to be used, "i" denotes the link on the transportation network and "t" denotes the time. The templates provide a mean value for the time period of the current (t'th) data, and the "x" represents the deviation from that mean. An embodiment of the invention involves using spatio-temporal autoregressive integrated moving average (ARMA) models to obtain the deviation terms, "x." One preferred approach is to define the spatial interactions by a set of fixed matrices, whereafter one returns to the easier-to-estimate temporal-only ARMA models. A way to accomplish this is to incorporate average speed information into each spatial interaction matrix, and define one such matrix to represent the case where each preceding time step is predominant.

For example, in a first such matrix, $S1(r)$, has the values of 1 where flow on a link can reach the link in question when the template being used is the r'th. Such links are said to be in the "relationship vector" of the given link. If the r'th template refers to a free flow regime, then it is straightforward, using an average speed and link lengths, to calculate which links' flows would contribute primarily to the link in question's characteristics. Similarly, matrix $S2(r)$ represents the links which are reachable by each other link from time step "t−2," when the template used is "r." Hence, some number of such matrices are preferably computed off-line, for each template set, r=1 ... R. This in turn represents a very large computational savings with respect to a general spatio-temporal ARMA model. In the latter case, as the size of the network grows, the number of parameters to estimate grows quadratically. In this embodiment of the algorithm, the number of parameters stays relatively fixed as the network size grows.

As to missing data, in a preferred practice, additional steps are included:

Estimates of the original set of weights for random component x(itr) as described above are made. These weights are used when the real time data are incomplete, or has been completed by the steps below.

As indicated, there is a relationship vector for each link. The estimator of the set of weights can be done, in parallel or in series, for each link independently. E.g. in considering one such link: Scenario 1 involves estimating the most recent data point when that link's most recent value is missing, but all other values from the relationship vector are present. Repeat for all links, thereby obtaining a set of scenario 1 weight matrices corresponding to "filling in" the most recent value for that link, given that all other values are present.

Or consider Scenario 2: In this case both the link's own most recent value and that of one other link in the relationship vector, chosen randomly, are missing or otherwise suppressed. The model then estimates the most recent value of that given link based on this modified data set. This is repeated for all links. This technique can be applied to Scenarios 3 to Scenario "n," where n is the length of the relationship vector for each link.

Then, in the real time phase:

One undertakes a first pass by selecting those links with missing real time data. One starts with the first such link; and chooses the appropriate weight vector depending upon which scenario is applicable (only the link's own data is missing; its own and one other link's data is missing, its own and two other links, etc.). One then "fills in" in the missing current data through use of the model and the appropriate weight vector, repeating until all missing data is filled in. The usual prediction real time phase on new, completed data set, is then applied.

Figures 2, 3:
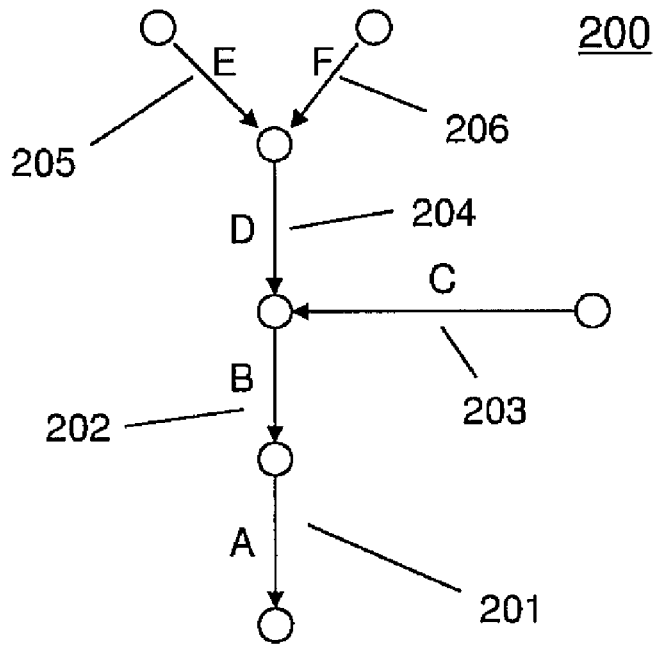
FIG. 2 shows exemplarily a small traffic network 200 used to illustrate the concepts of the present invention.
FIG. 3 shows exemplary formats 300, 301 of data of this small traffic network is stored in the templates of the present invention.

The method exemplarily described above is illustrated in a more concrete manner in FIGS. 2-4. FIG. 2 shows an exemplary simple network 200, with link A 201 as the link for which a prediction is to be calculated for demonstration of the technique. As can be seen, links are merely segments of roads interconnected by nodes, and a node may or may not have more than two links associated therewith. Depending upon the network scale and the desired granularity, a link might be a mile or less in length or many miles in length.

The network 200 is assumed to have traffic flow moving in the direction indicated as flowing toward link A 201. Of course, if link A 201 were a two-way road, a corresponding set of links would apply for traffic going into link A 201 from the opposite direction. In FIG. 2, links B,C,D,E,F 202-206 provide traffic into link A 201, as shown by the relationship vector 300 for link A shown in FIG. 3. The corresponding difference vector 301 for link A 201 is also shown in FIG. 3.

Since the difference vector 301 contains the latest deviation from historical data for all the links 202-206 that are related to link A within the time interval of the prediction, the deviation from the historical traffic in link A 201 will be the sum of the deviations in its associated links 202-206, so that the prediction for traffic in link A 201 can be simply predicted by adding the deviations in these links. The actual predicted traffic in link A would be the historical average of link A, as adjusted by the sum of the deviations in the links identified in its relationship vector 300. As demonstrated by step 110 of FIG. 1, subsequent time periods can then be predicted for link A 201 by reapplying the summed deviations of the relationship vector 300 links for each successive time period prediction.

FIG. 4 illustrates a block diagram 400 of a software application program that might be used to implement the present invention. Data receiver/transmitter module 401 receives traffic network data via input 402, as well as possibly receiving inputs from a user located remotely from the machine having the tool and transmitting information back to this remote user. Memory module 403 interfaces with memory 404, and calculator 405 executes all of the processing described above, as preferably broken down into recursive subroutines for the various specific calculations. Graphical user interface (GUI) module 406 allows a user to set up and use the tool, including scenarios of remote users in which the user is remotely located from the machine upon which the tool is actually installed.

Exemplary Hardware Implementation

FIG. 5 illustrates a typical hardware configuration of an information handling/computer system 500 in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., a display adapter 536 for connecting the bus 512 to a display device 538 and/or printer 539 (e.g., a digital printer or the like), or a reader scanner 540.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6) or optical storage diskette 602, directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

In-Vehicle Provision of Traffic Information:

In another aspect of the invention, in-vehicle navigation is contemplated using, e.g. traffic infrastructure such as traffic signals and the like, smartly configured to provide information such as guidance information to a vehicle. Thus this aspect of the invention provides a point of interaction, with smart infrastructure providing information to smart vehicles. Traffic signal systems can be programmed for phases based on historical traffic profiles. Some modern signal systems are adaptive, altering the phase attributes based on real-time detection of vehicles. In these cases, the signal systems are aware of the vehicles, and adapt accordingly. Notwithstanding, there is a vital need for vehicles to become aware of the signal systems whereupon they can be more effectively navigated to a destination. Such awareness can include without limitation information on the state of a traffic signal or signals within a given area, routing type information expressed e.g. as a table of relevant information such as travel time from a signal to another location, and can include predictive information as e.g. contemplated herein including estimation of missing real time data.

The following description of various non-limiting embodiments of the in-vehicle navigation aspect of the present invention. Thus for example, routing for vehicle navigation applications are typically based on a static representation of the road network. This includes a linear distance and travel time value for each link. More advanced services include historical average travel time values, and in some cases, real-time traffic conditions. However, driving outcomes in arterial or surface streets are highly dependent on the precise timings of intersection crossings along a route in addition to the selection of the route itself.

Relevant driving outcomes include trip duration and the avoidance of significant variations in speed, or stops and starts. Speed variation, particularly abrupt variations or stops and starts can work against several driver goals including fuel economy, vehicle wear, and stress levels.

Improved driving outcomes according to this aspect of the invention can be achieved through the incorporation of the current state of traffic signal phases throughout the network. This status information is communicated to vehicles by traffic signal systems, resulting in improved routing advice to drivers.

For example, a driver may cross many signalized intersections along a route, and the delay caused by wait time at these intersections can significantly impact the route selection. But in the practice of this invention, routing algorithms (e.g. as described herein) can incorporate the signal phase status over time into routing advice. Further, the route can be dynamically re-optimized throughout the trip. The resulting output to the driver can be without limitation in the form of navigation advice in the form of turn-by-turn instructions throughout a trip.

The contemplated calculations are designed to take place in whole or in part on a unit inside the vehicle, based on data transmitted from the signal. Nonetheless, some of the calculations could optionally be performed in the traffic signal system, with summary results communicated to the vehicle.

EXEMPLARY EMBODIMENTS

The following four embodiments are exemplary only of ways in which this aspect of the invention can be implemented.

Embodiment 1: one or more traffic signals provide, at more than one point in time, such as repeatedly at regular or irregular intervals, state information on the traffic signal itself. Such state information can include the point in time the signal is at during that instant, how much time is left of that cycle at that instant, and the duration of the cycle. For example, the state information for a traffic light may be that the signal is in the green cycle, there are 10 seconds remaining of the green cycle and the green cycle duration is 30 seconds.

This information may be updated regularly such as every second, or every 5 seconds, or at irregular intervals.

Embodiment 2: one or more traffic signals provide routing table-type information at more than one point in time, such as repeatedly at regular or irregular intervals. In addition, the traffic signal can also provide state information as described above. For example, routing table-type information can be expressed as the travel times from that signal (or a given location) at a point in time to one or more other locations, typically in the vicinity of that traffic signal. This computed information may take into account the traffic signal state information. The information may be updated regularly such as every second, or every 5 seconds, or at irregular intervals. The information aforesaid can be provided in various ways to the vehicle and other interested parties. E.g. one way is for the traffic signal to publish the information to a web page which can be accessed by an internet-enabled device in the vehicle.

In addition to the above data on traffic signal state, predictive information on traffic speeds or volumes can be provided to vehicles in an analogous manner. Hence, additional embodiments of this aspect of the invention include:

Embodiment 3: one or more traffic signals provide, at more than one point in time, such as repeatedly at regular or irregular intervals, state information on the traffic signal itself as well as currently-valid data on traffic or speed predictions for one or more road segments in the vicinity of the traffic signal. Such predictions may be, for example, the predicted speed on the adjacent road segments in some number of seconds or minutes.

Embodiment 4: one or more traffic signals provide routing table-type information at more than one point in time, such as repeatedly at regular or irregular intervals, based on the traffic signal state information as well as on the traffic flow or speed predictive information. In addition, the traffic signal can also provide state information and traffic flow or speed predictions for neighboring road segments, as described above.

As will be appreciated by the artisan, the practice of these embodiments of the invention at times contemplate other equipment or system capabilities that are conventional or otherwise obtainable, hence they are not described in detail herein. By way of example, these include:

basic network, map, and driving direction data, such as that supplied by NAVTEQ or TeleAtlas; in-vehicle navigation device with user interface and capability to be extended or programmed to take advantage of this additional advice; traffic signal control system that will provide the signal phase/cycle information; traffic signal control system with programmable capability (in some variations of the concept); communications between the traffic signal system and the vehicle device of adequate bandwidth and low latency; and capability to position vehicle through a mean precise enough for navigating through traffic signals.

Example of Embodiment 1

Method for Determining a Path for a Vehicle Using Traffic Signal Data

In this example, the vehicle reads, at periodic or at irregular intervals, the state information from the nearest one or more traffic signals. This can be accomplished by using the vehicle's own location information and reading information on any signals within a given radius of the vehicle. Using map-matching techniques that are widely available, it is possible to identify which traffic signal is on the route presently being traversed by the vehicle, or that will be traversed according to the existing path stored by the vehicle.

Thereafter, the following steps are carried out to determine a suitable route for the vehicle given the existing route information stored by the vehicle coupled with new information from the traffic signal(s).

Figure 7:
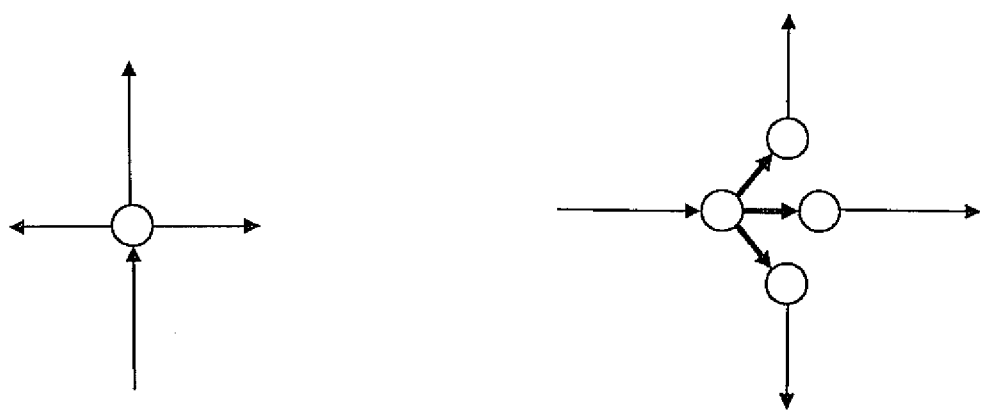
FIG. 7 illustrates a best path approach for the in-vehicle navigation practice of the present invention.

1. the route for vehicle based on the driver's origin and destination and other preferences, according to standard techniques such as available on in-vehicle navigation devices or other, is obtained. A time stamp is set to the value of t=1. A desired search radius is set to a value that will determine the number of traffic signals from which data will be obtained. This value may depend upon the density of the urban or suburban area in question.
2. at next time stamp, data from neighboring traffic lights using the desired radius is obtained. Map matching algorithms as exist in many devices can then be used to determine the roads on which the traffic signals are located.
3. travel times on the links in question are computed as follows:
   a) construct or use, if already constructed, an expanded network description, in which a traffic signal with adjacent road segments is expanded so as to represent the permissible movements from each segment at the signal.
   b) The travel times may be graphed to represent the travel times on the road segments themselves, e.g. based on their length, road type and possibly on their traffic levels as well. And in an expanded graph, the new links represent the turning or straight-forward movements at the traffic signals.
   The travel times on those links may be computed based on the traffic signal state data.
   c) these travel times are based on a vehicle's location at that time point. In one instance, the location to use is just before the signal. The additional time needed to get to that location is computed so as to provide relevant advice to the driver.
   d) given the location and the additional time needed to get to that location, as in c) above, if the current state for a particular signal is in the green cycle and sufficient time remains in that cycle to clear the intersection with a safety margin, then the travel time on the straight-forward expanded link would be the time to clear the intersection. Travel times on the right-turn and left-turn expanded links would be analogous, as would the time to clear the intersection in those directions, given that the current state has enough time remaining to do so.
   e) if the remaining time in a green cycle is insufficient to clear the intersection, and if turns on red are not permissible, then the travel time on the expanded links would be the duration of the red cycle plus the time needed to clear the intersection, in each of the directions described above.
   f) if turns on red are permissible, the travel time on the right-turn expanded link (or left-turn, in left-hand driving countries) would be the time to clear the intersection, without waiting for the cycle to become again green.
   g) if the current cycle is red, then the travel times on the expanded links would be the remaining time in the red cycle plus the time needed to clear the intersection in each direction.
4. the new times are then used in re-computing the route the vehicle should take. This can be performed by updating a data table in a best path calculation such as one using the commonly known Dijkstra algorithm, visually depicted in FIG. 7.

Example of Embodiment 2

In this example, the traffic signal provides not only state information on that signal, but also a type of routing table for nearby road segments, or links. This type of calculation and data storage is analogous to the data or computer or internet networks compute and store and provide to the nodes (computers) on the network. In this setting, a traffic light is analogous to a node in a computer network.

Several techniques exist for maintaining efficient routing tables. Some of them use the well-known Dijkstra algorithm for best route calculations.

This example can use the Dijkstra algorithm, in which a table of fastest times to each neighboring node is maintained, or another algorithm to accomplish this routing task. In typical data networks, such information is maintained for tens or hundreds of nodes in a vicinity of the node in question. In a road traffic network, such a number would be in many cases sufficient for a vehicle to determine its best route from origin to destination, as road traffic networks are more sparse than data or internet networks.

This information can manifest at the traffic light and can be updated at regular or irregular time points, as already described. Similar to the example of embodiment 1, the travel times in the table are updated at each of those time points based upon the traffic light information as taken from a particular location at a given time.

In this case, since the vehicle does not necessarily have access to the best path algorithm, the information provided by the traffic signal can be computed for several locations upstream from the signal. In this way, the vehicle can choose to accept the information for the point closest to its present location, or to a future expected location given its speed and present location.

The steps of the computation to be made at the traffic signal to complete the routing table are as above.

Example of Embodiment 3

A method for determining a path for a vehicle using traffic signal data and predictive traffic data. This example extends the example of embodiment 1 and involves making use not only of traffic signal data in real-time, but also predictive traffic data. Predictive traffic data may be disseminated in an analogous manner to the traffic signal data and used together to provide better advice to the driver of the vehicle.

Using the example of embodiment 1, only minor adjustments need to be made to incorporate predictive traffic information to same. If the predictive traffic information is predicted travel times, then on the original network links, as opposed to the expanded links which represent the movements in the intersection at the traffic signal, the travel times are updated with the predicted values. The computation of paths then proceeds as described above.

Example of Embodiment 4

This example extends the example of embodiment 2 and involves making use not only of traffic signal data in real-time, but also predictive traffic data as part of a routing table-type of information to be provided by the traffic signal to the vehicles. As before, predictive traffic data may be disseminated in an analogous manner to the traffic signal data and used together to provide better advice to the driver of the vehicle.

Using the example of embodiment 2, only minor adjustments need to be made to incorporate predictive traffic information into the method. If the predictive traffic information is predicted travel times, then on the original network links, as opposed to the expanded links which represent the movements in the intersection at the traffic signal, the travel times are updated with the predicted values. Then the computation of travel times in the routing table proceeds as described in Approach 2.

Single Lane Level Traffic Prediction:

In another practice, the invention provides a technique for determining the traffic state characteristics (for example, speed, density, flow, occupation and the like) that best characterize the progression of that state into the future at the level of a road lane. This practice of the invention allows real-time traffic prediction into the near-term future and is useful even when some of the real-time data is missing at the level of a road segment and more specifically at the level of a single lane of traffic. As will be appreciated, lane-specific traffic predictions are useful for applications requiring a significant amount of detail, such as traffic control systems and advanced route guidance tools.

The practice of this aspect of the invention has two preferred embodiments. The first embodiment requires real-time traffic data at the lane level. In the second embodiment, real-time data at the link level (multiple lanes) is available, but lane specific data is only available offline.

The algorithm described herein for these embodiments takes into account the fact that in practice, real-time data can be missing either for some links or even for entire lanes in a network.

The missing data can be estimated in accordance with that aspect of the invention described elsewhere herein as adapted to provide the specific techniques needed for it to work at the lane level.

This practice of the invention deals with the foregoing in a highly accurate yet scalable (computationally efficient) manner, enabling its use in real-time settings for medium and large-scale urban areas.

The overall structure of the algorithmic model is $$Y(itr) = m(itr) + x(itr)$$

where r denotes the template to be used, i denotes the link on the transportation network, and t denotes the time.

The templates provide a mean value for the time period of the current, t'th, data, and the x represents the deviation from that mean.

A preferred embodiment of the invention uses spatio-temporal autoregressive moving average (ARMA) models to obtain the deviation terms, x.

One preferred approach is to define the spatial interactions by a set of fixed matrices, whereafter one returns to the easier-to-estimate temporal-only ARMA models. One practice in this regard is to incorporate average speed information into each spatial interaction matrix, and define one such matrix to represent the case where each preceding time step is predominant.

For example, a first such matrix, $S1(r)$, would have values of 1 where flow on a link can reach the link in question when the template being used is the r'th. (such links are in the relationship vector of the given link) If the r'th template refers to a free flow regime, then using average speed and link lengths, one calculates which links' flows would contribute primarily to the link in question's characteristics. Similarly, $S2(r)$ would represent the links which are reachable by each other link from time step t−2, when the template used is r. Hence, some number of such matrices are preferably computed offline, for each template set, r=1 . . . R. This represents a large computational savings with respect to a general spatia-temporal ARMA model. In the latter case, as the size of the network grows, the number of parameters to estimate grows quadratically. In this embodiment of the algorithm, the number of parameters stays relatively fixed as the network size grows.

Two embodiments are now described for the lane-specific predictions contemplated by the invention, each depending on the availability or non-availability (missing data) of lane-specific data in real-time.

Lane Specific Traffic Prediction:

Embodiment One (Where Real-Time Lane-Specific Data is Available)

Preferably, Steps i-v are offline.

Step i: Determine, for each link, the time dependency to include in model for nearest-neighbor links with lane-specific traffic data (t−1, t−2, etc.)

Step ii: Determine neighborhood, $N_1$, to include in model with lane-specific traffic data, using, e.g. Model selection criteria on how many upstream and downstream links Step iii: Determine full neighborhood to include in model, in terms of upstream and downstream links, $N_2$.

Step iv: Aggregate lane-level traffic data to segment-level data for those links in full neighborhood not included in lane-specific neighborhood of Step ii, i.e., for those links in $N_2 \backslash N_1$ Step v: Estimate parameters of model on combined data of Steps ii, iii, iv.

Step vi: In real time, for each link, perform aggregation of link-level data in accordance with Step iv, and apply model to resulting real-time data to obtain link-level prediction.

Step vii: Repeat for other links in network.

Embodiment Two (Where Real-Time Lane-Specific Data is not Available in Real-Time, but Only Offline)

Preferably, Steps i-ii are offline.

Step i: Apply the existing methods to the link-level traffic data, defined by aggregation from data of each lane in an offline phase.

Step ii: Define an auxiliary vector of proportions of individual lane's data as opposed to the aggregated data for each link. Using time-series techniques, obtain a model of this proportion vector.

Step iii: In the real-time phase, apply the proportion vector to the forecasted traffic data at link-level to extract the real-time traffic prediction of traffic at lane-level.

In order to make lane-specific predictions in the presence of missing data the two embodiments above must be adapted accordingly as follows:

Embodiment One (adapted for missing data): real-time lane-specific data is available, but some lane-level data is missing, using historical lane-level data, estimate missing-data models by lane as follows:

Step i: (Offline) Establish single-lane models for each lane and calibrate parameters for each lane. E.g. if a segment has 3 lanes, one such model for each lane will be calibrated.

Step ii: (Real-time) If a link has only one lane of traffic data available, then apply above model for the appropriate lane.

Step iii: If two or more lane-specific data points for a single link are missing, then apply model from Step i for each such lane. Hence, for each desired output, two or more predictions will be performed. Take a convex combination of the resulting predictions. Weights may be determined in the offline phase or a default value of the arithmetic mean may be used.

Embodiment Two (adapted for missing data) Case II': Real-time lane-specific data is not available, but some lane-level data is missing, using historical lane-level data, estimate missing-data models using a previously-filed patent in conjunction with method II, by estimating first the missing data at the link-level and then applying historical lane-specific data to obtain weights.

What is claimed is:

1. A method for predicting traffic on a transportation network, said transportation network comprised of links, said links constituting a relationship vector, said method comprising:
   a) providing data points related to real time traffic conditions on each link, wherein at least one data point is missing for a given link;
   b) estimating the value of said missing data point from a calibrated model representative of historical data points from all links in the relationship vector, except those from the given link; and
   c) using said estimated value to predict traffic for at least a portion of said transportation network by deviation from a historical traffic pattern of said network, wherein said estimating said value of said missing data point comprises:
   running a plurality of models for the given link having a missing data point at a most recent time, wherein a model provides either estimating a value for said missing data point of said given link at a most recent time when all other neighboring links of said relationship vector have data at said most recent time, or estimating a value for said missing data point when one or more other neighboring links of said relationship vector is missing a respective data point at said most recent time,
   generating from each said run model a respective associated weight matrix for said given link;
   storing each respective associated weight matrix for said given link;
   determining an applicable model corresponding to a current real-time traffic network condition of said links of said relationship vector; and
   choosing an associated estimated weight matrix of said plurality based on said applicable model, said chosen associated estimated weight matrix used by said calibrated model to determine said missing data point value for real-time traffic prediction, wherein at least one of the steps is performed by at least one processor.

2. The method of claim 1 wherein a plurality of data points are missing from a plurality of given links.

3. The method of claim 1 wherein said data points are provided from predetermined locations.

4. The method of claim 1 wherein in said historical data points comprise that for the preceding six or more weeks for the links constituting the calibration model.

5. The method of claim 4 wherein said calibration model is updated periodically.

6. The method of claim 1 wherein said estimating step is performed off-line.

7. An apparatus for predicting traffic on a transportation network, said transportation network comprised of links, said links constituting a relationship vector, said apparatus comprising:
   a) a receiver to receive data points related to real time traffic conditions on each link, wherein at least one data point is missing from a given link;
   b) an estimator to estimate the value of said missing data point using a calibrated model comprising historical data points from all links in the relationship vector, except those from the given link; and
   c) a calculator to calculate a traffic prediction by using said estimated value in a deviation from a historical traffic pattern of said network, wherein said estimator is configured to perform a method to:
   run a plurality of models for the given link having a missing data point at a most recent time, wherein a model provides either estimating a value for said missing data point of said given link at a most recent time when all other neighboring links of said relationship vector have data at said most recent time, or estimating a value for said missing data point when one or more other neighboring links of said relationship vector is missing a respective data point at said most recent time,
   generate from each said run model a respective associated weight matrix for said given link; and
   store each respective associated weight matrix for said given link; and
   said calculator is further configured to:
   determine an applicable model corresponding to a current real-time traffic network condition of said links of said relationship vector; and
   choose an associated estimated weight matrix of said plurality based on said applicable model, said chosen associated estimated weight matrix used by said calibrated model to determine said missing data point value for real-time traffic prediction.

8. The apparatus of claim 7 wherein said data points are provided from predetermined locations.

9. A non-transitory computer readable medium containing an executable program for predicting traffic on a transportation network, said transportation network comprised of links, said links constituting a relationship vector, where said program performs the steps of:
   a) receiving data points related to real time traffic conditions on each link wherein at least one data point is missing from a given link;
   b) estimating the value of said missing data point from a calibrated model representative of historical data points from all links in the relationship vector, except those from the given link; and
   c) calculating a traffic prediction by using said estimated value in a deviation from a historical traffic pattern of said network, wherein the program performs the steps of:
   running a plurality of models for the given link having a missing data point at a most recent time, wherein a model provides either estimating a value for said missing data point of said given link at a most recent time when all other neighboring links of said relationship vector have data at said most recent time, or estimating a value for said missing data point when one or more other neighboring links of said relationship vector is missing a respective data point at said most recent time,
   generating from each said run model a respective associated weight matrix for said given link;
   storing each respective associated weight matrix for said given link;
   determining an applicable model corresponding to a current real-time traffic network condition of said links of said relationship vector; and
   choosing an associated estimated weight matrix of said plurality based on said applicable model, said chosen associated estimated weight matrix used by said calibrated model to determine said missing data point value for real-time traffic prediction.

10. The computer readable medium of claim 9 wherein the historical data points in said calibration model are periodically updated.

11. A non-transitory computer readable medium containing an executable program for predicting traffic on a transportation network, said transportation network comprised of links, said links constituting a relationship vector, wherein the program performs the steps of:
  a) providing data points related to real time traffic conditions on each link, wherein at least one data point is missing for a given link;
  b) estimating the value of said missing data point from a calibrated model representative of historical data points from all links in the relationship vector, except those from the given link; and
  c) using said estimated value to predict traffic for at least a portion of said transportation network by deviation from a historical traffic pattern of said network, wherein the program performs the steps of:
  running a plurality of models for the given link having a missing data point at a most recent time, wherein a model provides either estimating a value for said missing data point of said given link at a most recent time when all other neighboring links of said relationship vector have data at said most recent time, or estimating a value for said missing data point when one or more other neighboring links of said relationship vector is missing a respective data point at said most recent time,
  generating from each said run model a respective associated weight matrix for said given link;
  storing each respective associated weight matrix for said given link;
  determining an applicable model corresponding to a current real-time traffic network condition of said links of said relationship vector; and
  choosing an associated estimated weight matrix of said plurality based on said applicable model, said chosen associated estimated weight matrix used by said calibrated model to determine said missing data point value for real-time traffic prediction.

* * * * *